(12) United States Patent
Nagata et al.

(10) Patent No.: US 10,850,709 B1
(45) Date of Patent: Dec. 1, 2020

(54) FACIAL RECOGNITION AND OBJECT DETECTION FOR VEHICLE UNLOCKING SCENARIOS

(71) Applicant: TOYOTA MOTOR ENGINEERING & MANUFACTURING NORTH AMERICA, INC., Plano, TX (US)

(72) Inventors: Katsumi Nagata, Foster City, CA (US); Ryan M. Wiesenberg, Ann Arbor, MI (US); Chris Risberg, Flower Mound, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/552,966

(22) Filed: Aug. 27, 2019

(51) Int. Cl.
| | |
|---|---|
| *B60R 25/25* | (2013.01) |
| *B60R 25/24* | (2013.01) |
| *B60R 25/30* | (2013.01) |
| *H04W 4/40* | (2018.01) |
| *G06K 9/00* | (2006.01) |
| *G07C 9/25* | (2020.01) |
| *G07C 9/26* | (2020.01) |

(52) U.S. Cl.
CPC ............ *B60R 25/25* (2013.01); *B60R 25/241* (2013.01); *B60R 25/305* (2013.01); *G06K 9/00335* (2013.01); *G07C 9/253* (2020.01); *G07C 9/257* (2020.01); *H04W 4/40* (2018.02); *G07C 9/26* (2020.01)

(58) Field of Classification Search
CPC ..... B60R 25/25; B60R 25/241; B60R 25/305; G07C 9/253; G07C 9/257; G07C 9/26; H04W 4/40; G06K 9/00335; G06K 21/62; G06K 9/78

USPC .................................. 340/5.53, 5.52
See application file for complete search history.

(56) References Cited

U.S. PATENT DOCUMENTS

| | | | | |
|---|---|---|---|---|
| 7,382,895 | B2* | 6/2008 | Bramblet | G07C 9/00 382/103 |
| 8,330,814 | B2* | 12/2012 | Matsuda | G07C 9/00 348/143 |
| 8,598,980 | B2* | 12/2013 | Evans | G07C 9/37 340/5.52 |
| 8,665,062 | B2* | 3/2014 | Bragagnini | G07C 9/38 340/5.52 |
| 9,783,162 | B2 | 10/2017 | Hoyos | |
| 9,892,413 | B2* | 2/2018 | Crowell | G06Q 20/1085 |
| 9,902,266 | B2* | 2/2018 | Pisz | B60K 37/06 |

(Continued)

*Primary Examiner* — Nam V Nguyen
(74) *Attorney, Agent, or Firm* — Sheppard, Mullin, Richter & Hampton LLP; Hector A. Agdeppa; Daniel N. Yannuzzi

(57) ABSTRACT

According to various embodiments of the disclosed technology systems and methods for biometric access control for a vehicle may include: capturing an image of two or more individuals approaching the vehicle; analyzing the captured image to determine whether one or more of the individuals approaching the vehicle is an authorized user of the vehicle; where at least one, but not all, of the two or more individuals approaching the vehicle is identified as an authorized user of the vehicle, analyzing the captured image to determine an emotional level between an identified authorized user of the vehicle and an unauthorized user of the vehicle; and performing a vehicle access security operation based on the determined emotional level between the authorized user of the vehicle and the unauthorized user of the vehicle.

22 Claims, 7 Drawing Sheets

(56) References Cited

U.S. PATENT DOCUMENTS

| | | | |
|---|---|---|---|
| 10,032,170 B2 * | 7/2018 | Crowell | G06Q 20/4093 |
| 10,146,925 B1 * | 12/2018 | Rosenberg | G06K 9/00677 |
| 10,196,068 B2 | 2/2019 | Yoo | |
| 10,235,822 B2 * | 3/2019 | Nye | G07C 9/37 |
| 10,541,999 B1 * | 1/2020 | Rosenberg | G06F 21/32 |
| 2004/0153671 A1 * | 8/2004 | Schuyler | G07C 9/28 |
| | | | 726/9 |
| 2007/0189585 A1 * | 8/2007 | Sukegawa | G07C 9/37 |
| | | | 382/118 |
| 2015/0077237 A1 * | 3/2015 | Chou | G06F 3/0483 |
| | | | 340/439 |
| 2016/0300410 A1 | 10/2016 | Jones | |
| 2017/0125008 A1 * | 5/2017 | Maisonnier | B25J 11/0005 |
| 2019/0102963 A1 * | 4/2019 | Owens | E05B 83/30 |
| 2020/0110863 A1 * | 4/2020 | Zhang | G06K 9/00302 |
| 2020/0214626 A1 * | 7/2020 | Boyle | A61B 5/0002 |

* cited by examiner

FACIAL RECOGNITION AND OBJECT DETECTION FOR VEHICLE UNLOCKING SCENARIOS

TECHNICAL FIELD

The present disclosure relates generally to vehicular security, and in particular, some implementations may relate to facial recognition and image analysis to determine vehicle unlocking scenarios.

DESCRIPTION OF RELATED ART

Access to many modern-day vehicles is accomplished using a key fob to control an actuator to operate a door locking device. Such systems operate in response to the user depressing a button on the fob to lock or unlock doors, open the front or rear deck left, enter a panic mode, and so on. Some more advanced systems offer hands-free approach in which the key fob is identified as the user approaches the vehicle, automatically unlocking the door without requiring the user to press any buttons.

Some systems allow user flexibility in terms of which doors are opened by the key fob. For example, certain vehicles may be programmed such that one click of the unlock button only unlocks the driver door and a second click is required to unlock all the doors of the passenger compartment.

It is an ongoing challenge of the automotive industry to improve vehicle functionality and design to provide a more satisfying or enjoyable user experience or to simply make access to the vehicle less of a hassle for the user. Automotive designers have continually strived for ways to improve the user experience of their vehicles and to offer features that may distinguish their vehicles from those of other manufacturers. Vehicle designers are also seeking ways to make a system less prone to misuse and to provide enhanced security for the vehicles and their operators.

BRIEF SUMMARY OF THE DISCLOSURE

According to various embodiments of the disclosed technology a method of biometric access control for a vehicle, using artificial intelligence (AI) with high accuracy of determination logic, may include: capturing an image of two or more individuals approaching the vehicle; analyzing the captured image to determine whether one or more of the individuals approaching the vehicle is an authorized user of the vehicle; where at least one, but not all, of the two or more individuals approaching the vehicle is identified as an authorized user of the vehicle, analyzing the captured image to determine an emotional level between an identified authorized user of the vehicle and an unauthorized user of the vehicle; and performing a vehicle access security operation based on the determined emotional level between the authorized user of the vehicle and the unauthorized user of the vehicle.

The vehicle access security operation may include: opening a door for each of the approaching individuals where the interaction between the authorized user of the vehicle and the unauthorized user of the vehicle is determined to be an unhostile interaction; and opening a door for only the authorized user of the vehicle when the interaction between the authorized user of the vehicle and the unauthorized user of the vehicle is determined to be a hostile interaction. Opening a door may include unlocking the door or physically opening the door.

In some embodiments, the vehicle access security operation may include not opening any door of the vehicle when the interaction between the authorized user of the vehicle and the unauthorized user of the vehicle is deemed to be a hostile interaction.

The method may further include initiating an alert when the interaction between the authorized user of the vehicle and the unauthorized user of the vehicle is deemed to a hostile interaction.

Analyzing the captured image using AI to determine whether one or more of the individuals approaching the vehicle is an authorized user of the vehicle may include performing facial recognition on a captured image of the one or more individuals to determine an identify of the one or more individuals approaching the vehicle.

The method may further include determining a user profile for an identified individual and using the user profile to determine a seating position for that identified individual and which vehicle door to open corresponding to that seating position. The method may further include using the user profile to adjust vehicle configuration settings at the seating position determined for the identified individual.

The method may further include: analyzing the captured image using AI to identify individuals of the plurality of individuals approaching the vehicle; and based on the identification and authorization of one or more of the plurality of individuals approaching the vehicle, opening a particular door of the vehicle for each of the identified individuals approaching the vehicle who are authorized to access the vehicle.

The method may further include: analyzing the captured image using AI to determine a class of an unidentified individual, and determining a door of the vehicle to open for that individual based on the determined class of the individual.

A vehicle control system may include: a processor; and a memory coupled to the processor to store instructions, which when executed by the processor, cause the processor to perform operations, the operations including capturing an image of two or more individuals approaching the vehicle; analyzing the captured image using AI to determine whether one or more of the individuals approaching the vehicle is an authorized user of the vehicle; where at least one, but not all, of the two or more individuals approaching the vehicle is identified as an authorized user of the vehicle, analyzing the captured image using AI to determine an emotional level between an identified authorized user of the vehicle and an unauthorized user of the vehicle; and performing a vehicle access security operation based on the determined emotional level between the authorized user of the vehicle and the unauthorized user of the vehicle.

In some embodiments, the vehicle access security operation may include: opening a door for each of the approaching individuals where the interaction between the authorized user of the vehicle and the unauthorized user of the vehicle is determined to be an unhostile interaction; and opening a door for only the authorized user of the vehicle when the interaction between the authorized user of the vehicle and the unauthorized user of the vehicle is determined to be a hostile interaction. Opening a door may include unlocking the door or physically opening the door.

In some embodiments, the vehicle access security operation may include not opening any door of the vehicle when the interaction between the authorized user of the vehicle and the unauthorized user of the vehicle is deemed to be a hostile interaction.

The operations may further include initiating an alert when the interaction between the authorized user of the vehicle and the unauthorized user of the vehicle is deemed to a hostile interaction.

In some embodiments, analyzing the captured image using AI to determine whether one or more of the individuals approaching the vehicle is an authorized user of the vehicle may include performing facial recognition on a captured image of the one or more individuals to determine an identify of the one or more individuals approaching the vehicle. The operations may further include determining a user profile for an identified individual and using the user profile to determine a seating position for that identified individual and which vehicle door to open corresponding to that seating position. In some embodiments, the operations further include using the user profile to adjust vehicle configuration settings at the seating position determined for the identified individual.

In some embodiments, the operations further include: analyzing the captured image using AI to identify individuals of the plurality of individuals approaching the vehicle; and based on the identification and authorization of one or more of the plurality of individuals approaching the vehicle, opening a particular door of the vehicle for each of the identified individuals approaching the vehicle who are authorized to access the vehicle.

In some embodiments, the operations further include: analyzing the captured image using AI to determine a class of an unidentified individual, and determining a door of the vehicle to open for that individual based on the determined class of the individual.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
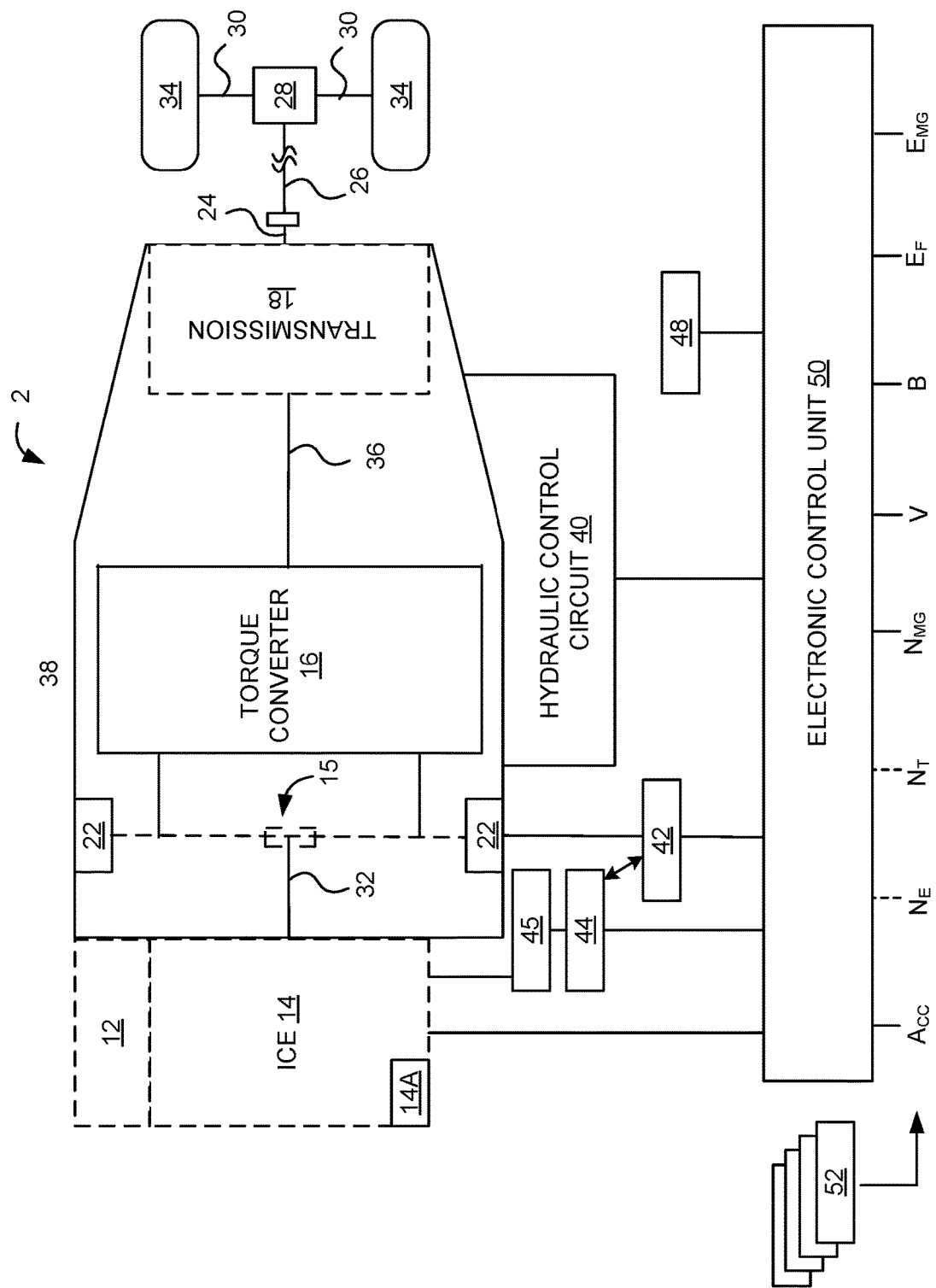
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Embodiments of the systems and methods disclosed herein can provide systems and methods for enhanced vehicle access. Embodiments may use image data to authenticate permission of a driver or passengers to access the vehicle automatically as a driver approaches the vehicle. Image data can be collected from persons approaching the vehicle and analyzed to authenticate the permission of the persons approaching. The analysis can be performed using artificial intelligence (AI). The vehicle can evaluate the authenticated individuals and unlock or open doors automatically as a recognized operator or recognize passengers approach the vehicle.

When an individual operator approaches the vehicle and that individual is recognized by the vehicle as an authorized driver for that vehicle, the vehicle might be configured to only unlock and open the driver's door to allow driver access. When a recognized "couple" approaches the vehicle, the vehicle may automatically unlock and open both front doors, determine that one member of the couple is typically always the driver and configure driver and passenger settings (not just seats and mirrors, but also zoned climate control and other settings) or that driver. When a parent or parents in one or more recognized children approach the vehicle the vehicle may open the appropriate doors based on learned seating positions and configure the vehicle for those passengers. The system might also be configured to determine which person or persons of the recognized couple, family or other group is approaching which door of the vehicle, and configure the driver and passenger settings accordingly.

In further embodiments, image analysis might be used to evaluate the interaction between approaching individuals to determine whether accommodation should be made for otherwise unrecognized individuals. For example, the vehicle may detect a known operator approaching the vehicle with 3 other adults. The adults may be talking and chatting with one another in a collegial manner. (As opposed to ignoring one another) in which case, the vehicle may interpret that these 4 adults are about to get into the vehicle together and that all 4 doors should be unlocked and opened. If the vehicle recognizes through image analysis that an altercation is occurring, the vehicle might only unlock the driver door and simultaneously sound the vehicle alarm.

User habits can be collected and remembered over time so that the vehicle can learn and respond to operator and passenger preferences automatically. These preferences can be stored on the vehicle or at a storage location external to the vehicle (e.g., a cloud-based storage facility) and recalled when passengers are recognized. The technology may also learn different habits or preferences for different days of the week or times of the day. For example, a couple approaching the vehicle over the weekend might lead to different user preference settings than the same couple approaching vehicle in the morning on a weekday or in the evening on a weekday. Similarly, the system might be configured to learn that when a couple approaches the vehicle together on weekday mornings, only one of the couple gets in the vehicle and the other one continues past the vehicle; whereas when that couple approaches the vehicle together on a weekend evening, they generally both enter the vehicle and one particular individual of that couple is generally the driver and the other the passenger.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for vehicle access control can be implemented in other types of vehicle including gasoline- or diesel-powered vehicles, fuel-cell vehicles, electric vehicles, or other vehicles.

FIG. 1 illustrates a drive system of a vehicle 2 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 2 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump, and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44.

Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 2 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 2. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MS}$, of the motor 22 (motor rotational speed), and vehicle speed, $N_v$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 2 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
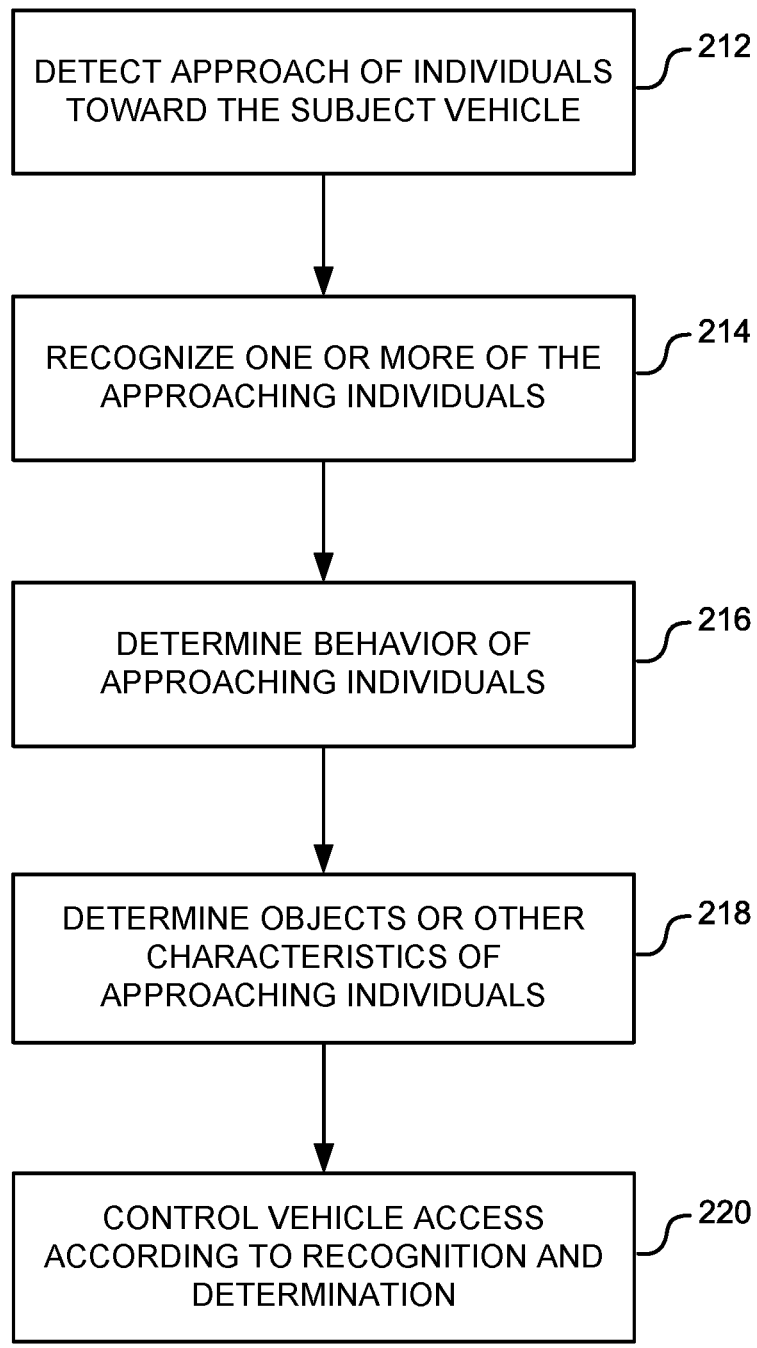
FIG. 2 illustrates an example process for vehicle unlocking scenarios based on facial recognition in accordance with one embodiment.

FIG. 2 illustrates an example process for vehicle unlocking scenarios based on facial recognition in accordance with one embodiment. With reference now to FIG. 2, at operation 212 the system detects individuals approaching the subject vehicle. For example, one or more of a variety of sensors can be used to detect approaching individuals. At operation 214, images of the approaching individuals may be collected, and the system can use facial recognition or other image-analysis-based recognition techniques to determine whether the system recognizes one or more of the approaching individuals. If an approaching individual is recognized as an operator of the vehicle or other authorized entrant of the vehicle, the system may unlock the appropriate door or doors for that individual are those individuals. In further embodiments, the appropriate door or doors may be automatically opened to allow the recognized individual or individuals to access the vehicle.

In various embodiments, authorized vehicle operators and passengers can be registered to the vehicle as authorized users through a variety of techniques. For example, authorized persons may register using a smart phone app, website, or other like access application to register as authorized operators or passengers. The system can collect identification data as well as biometric data to be stored in the system (e.g., ECU 50 (FIG. 1), vehicle access control system 340 (FIG. 5) or other storage locations. In some applications, the vehicle itself can be used to register authorized operators or passengers. For example, in-vehicle cameras or other biometric sensors can be used to capture and store biometric information for authorized users. In some embodiments, the vehicle can learn and automatically add authorized operators or passengers over time based on history of vehicle access and usage.

Where the system does not recognize all of the approaching individuals, the system can perform further analysis on the approaching group to determine whether it should unlock the vehicle and, if so, to what extent it should unlock the vehicle. For example, the system may be configured to analyze video or other motion images of the approaching individuals captured by one or more vehicle cameras to determine the nature of the interaction among the individuals. The system may analyze the images to determine whether the unrecognized individuals are engaging in cordial or friendly behavior with the recognized individuals. If so, the system may determine that it is appropriate to unlock all the vehicle doors, or to unlock a door for each approaching individual. The system may evaluate the interaction between the individuals to determine whether they are engaging in an interplay such as holding hands, walking arm in arm, looking at each other conversing and smiling, and so on. Facial recognition can be used to determine whether recognized individuals appear happy or content, or whether they appear frightened. AI algorithms can be employed to perform the analysis of the individuals and their interactions to determine an emotional level of the interactions and to determine whether unrecognized individuals are friendly or hostile (or other category of) individuals. Machine learning techniques can be used to train models for the analysis based on data from prior interactions between recognized and unrecognized individuals. Confirmation of the results from authorized individuals can be used to refine the models. This data can be gathered from subject vehicle or it may be gathered from multiple different vehicles across a wide array of participants.

The system may automatically register or store the Biometric data of the unrecognized individuals as guests of the vehicle. This information might be called upon in the future when the same individuals are recognized approaching the vehicle at a later date or time. Accordingly, these people can be registered as authorized guests and this information can be used by the AI algorithm when analyzing approaching individuals and their interactions for vehicle access control.

The system may also analyze the images to determine whether the unrecognized individuals are engaging in hostile behavior toward the recognized individuals. For example, image analysis may be used to determine whether the unrecognized individuals are pushing or shoving the recognized individuals. The system may also determine facial expressions of recognized and unrecognized individuals to determine whether the recognized individuals are unhappy or appear to be in fear. More the behavior appears hostile, the system may be configured to unlock only enough doors for the recognized individuals. In the case where there is only one recognized individual, the system may be configured to only unlock the driver door so that the recognized driver can enter the vehicle while the other apparently hostile unrecognized individuals remain locked out of the vehicle. The system can further be configured to immediately re-lock the unlocked door or doors when the corresponding recognized individuals enter the vehicle. In hostile situations, the system may further be configured to trigger audible or visual alerts to warn away the hostile individuals or to draw attention to the vehicle. In yet further embodiments, the system may be configured to send messages alerting others such as law enforcement or friends and family of the potentially dangerous situation.

The system may automatically register or store the Biometric data of the unrecognized individuals as hostile individuals. This information might be called upon in the future when the same individuals are recognized approaching the vehicle at a later date or time. Accordingly, these people can be registered as unauthorized individuals and this information can be used by the AI algorithm when analyzing approaching individuals and their interactions for vehicle access control.

In these and other embodiments, the system may be configured to also recognize other signals provided by recognized individuals to confirm or override the system's access decision. In some implementations, the system can employ gesture recognition to enable recognized individuals to communicate with the vehicle using various gestures, including innocuous gestures that might not be recognized by hostile parties. The system may also be configured such that signals from a key fob operated by a recognized user may override the system decision.

At operation 218, the system may further be configured to analyze the images to evaluate objects or other characteristics of approaching individuals. Objects in the hands of individuals can be evaluated to determine the type of object, and whether the object poses a threat or otherwise requires special handling. For example, the system may be configured to analyze images of objects and compare them with other known objects to determine whether individuals are holding a gun or knife or other weapon. The system may also determine whether one or more approaching individuals is carrying a package, and the system might use this determination to further determine whether to open the vehicle's trunk, hatch or cargo compartment door so that the individual can place the package in the cargo compartment.

As the above examples illustrate, at operation 220, the system can control vehicle access according to the image recognition and determination made at operations 214 through 218. As noted above, where only one approaching individual is recognized, the system might only open one door unless behavior of the individuals indicates otherwise. In various applications, the system may be configured to use facial recognition to not only determine whether approaching individuals are authorized passengers, but to also determine where those authorized passengers typically sit in the vehicle so that the system can open the appropriate door for the appropriate passenger. For example, the system may determine that a driver and his or her spouse are approaching the vehicle, in which case the system would unlock and possibly automatically open the driver's door and the door to the seating position where the spouse typically sits.

The system may also be able to determine the class of individual, such as adult, child, toddler, infant, handicapped, elderly, regular passenger, trusted passenger and so on. For example, the system might determine that a driver and his or her two children are approaching the vehicle. The system may further determine the identity of the children as child A and child B, and that child A always sits in the left rear seating position, and child B always sits in the front passenger position when the spouse is not present and the right rear seating position when the spouse is present. Accordingly, the system can use this information to open the two front vehicle doors and the left rear door when the driver approaches with the two identified children, or the two front vehicle doors and two rear vehicle doors when the driver approaches with his or her spouse and two children. As still further example, the system may identify a driver approaching with child A and child C. The system may further have determined that child C always sits in the right rear seating position, unlike child B. Accordingly, in this case, the system can be configured to open the front driver's door and the two rear passenger doors.

Special use cases can also be provided depending on the class or type of vehicle or the purpose for which the vehicle is being used. For example, where the vehicle is being used for a ride-sharing service, a trusted passenger would only be allowed to open the door of the vehicle at the time of the service request. Users of the ride-sharing application may be requested to register using the ride-sharing app or website, which might include performing facial recognition on right-sharing users at the time of registration. Accordingly, a vehicle used for ride-sharing services may perform facial recognition on an approaching individual to confirm that they are a registered user of the service and that they are the user who requested the corresponding vehicle. This can add a measure of safety to ride-sharing services. Additionally, in-vehicle cameras can capture images of and perform facial recognition on the vehicle driver to confirm that the vehicle driver is the authorized driver for the subject ride-sharing vehicle. The system can send a confirmation to the ride-sharing service as well as to the requesting passenger to confirm that the driver is the authorized driver for that vehicle.

Figure 3:
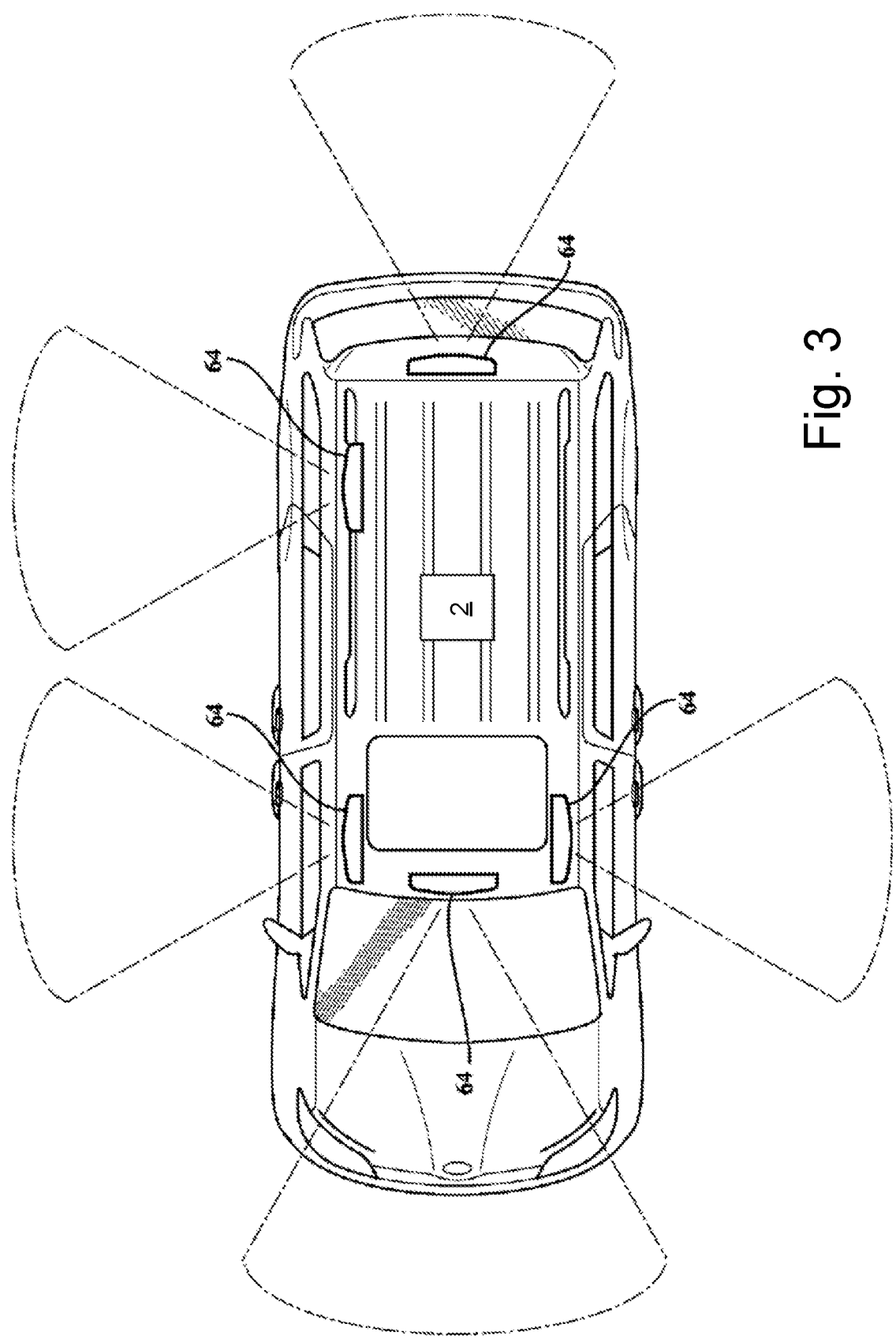
FIG. 3 illustrates a top down view of an example vehicle equipped with sensors to detect approaching individuals.
Figure 4:
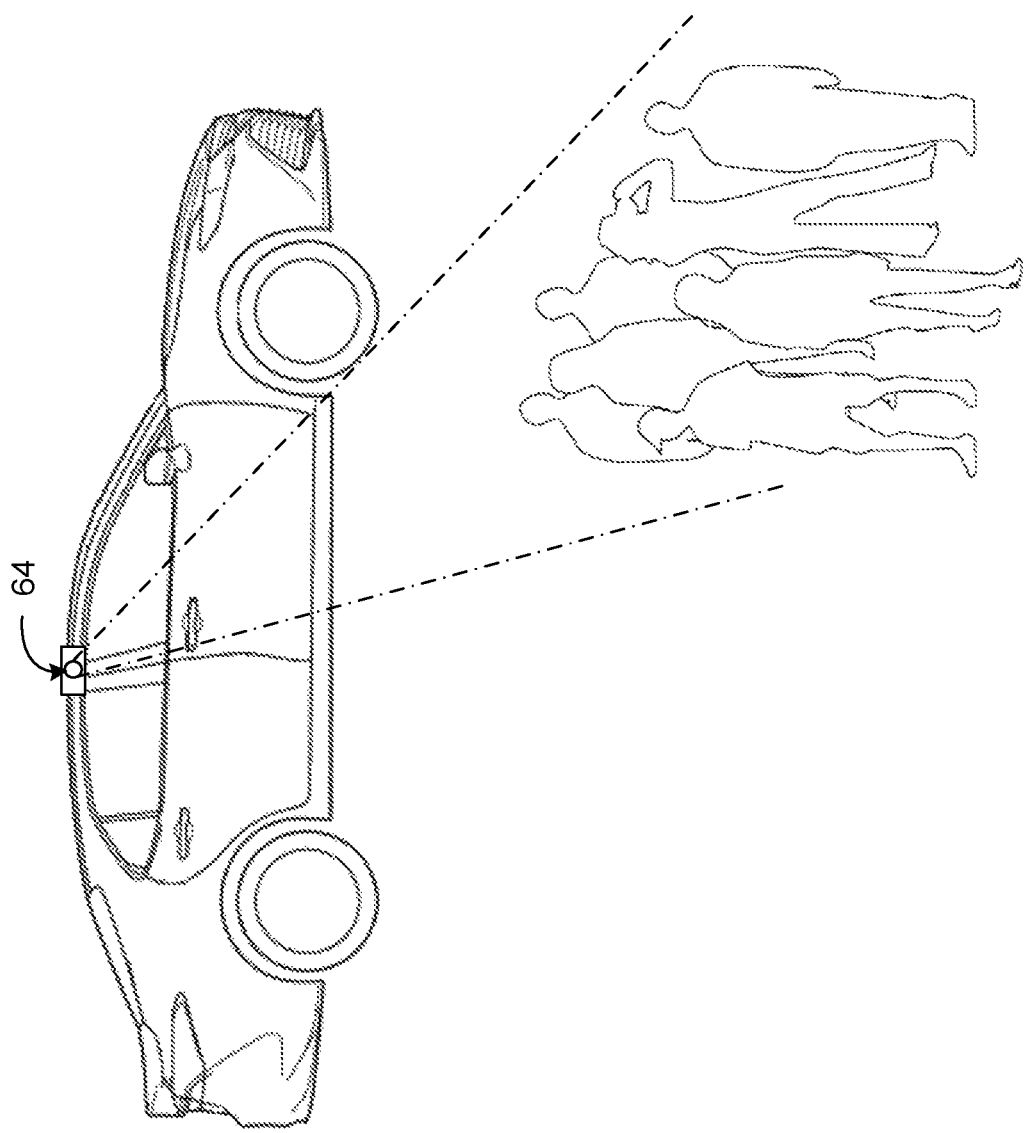
FIG. 4 illustrates a side view of the example vehicle of FIG. 3, with a group of seven approaching individuals.

FIG. 3 illustrates a top down view of an example vehicle equipped with sensors to detect approaching individuals. FIG. 4 illustrates a side view of the example vehicle of FIG. 3, with a group of seven approaching individuals. With reference now to FIGS. 3 and 4, the example subject vehicle 2 includes a plurality of image sensors 64 positioned about the subject vehicle 2 such that they can capture a substantially 360° view surrounding the vehicle. In various embodiments, other sensors can be used in place of or in addition to image sensors to detect approaching individuals. For example, radar, lidar, infrared, ultrasonic, or other sensors can be used to detect approaching individuals. As a further example, parking sensors or adaptive cruise control sensors can also be used in addition to or in place of image sensors 64 to detect the presence of approaching individuals. Image sensors 64 can be cameras or other image sensors dedicated to the vehicle access control system. In other embodiments, some or all of the cameras can be shared with other functions such as, for example, reversing cameras, surround-view cameras, forward-looking cameras or other cameras used for other vehicle functions.

Although an image sensor is 64 is not included in this example at the left rear quarter of vehicle 2, an image sensor 64 may be provided here as well. Additionally, other quantities of sensors can be used to detect the approach of individuals and to capture images of approaching individuals. Image sensors 64 may also be mounted at other positions on the vehicle in addition to or besides those illustrated in the example of FIGS. 3 and 4.

The example of FIG. 4 illustrates a side mounted image sensor 64 used to detect approaching individuals and to capture images of detected approaching individuals. As noted above, other sensors aside from image sensors 64 can be used to detect approaching individuals. Image sensors 64 need not be mounted above the front window of the vehicle, but can be mounted in other positions about the vehicle. Additionally, as noted above, other quantities of image sensors 64 can be provided. Typically, the greater coverage provided by image sensors, the more effective the system at detecting approaching individuals and evaluating the identity and nature of the approaching individuals. In some embodiments, wider angle image sensors may be used such that a lesser quantity of image sensors is required then in the case of an implementation with image sensors having a narrower viewing angle.

Figure 5:
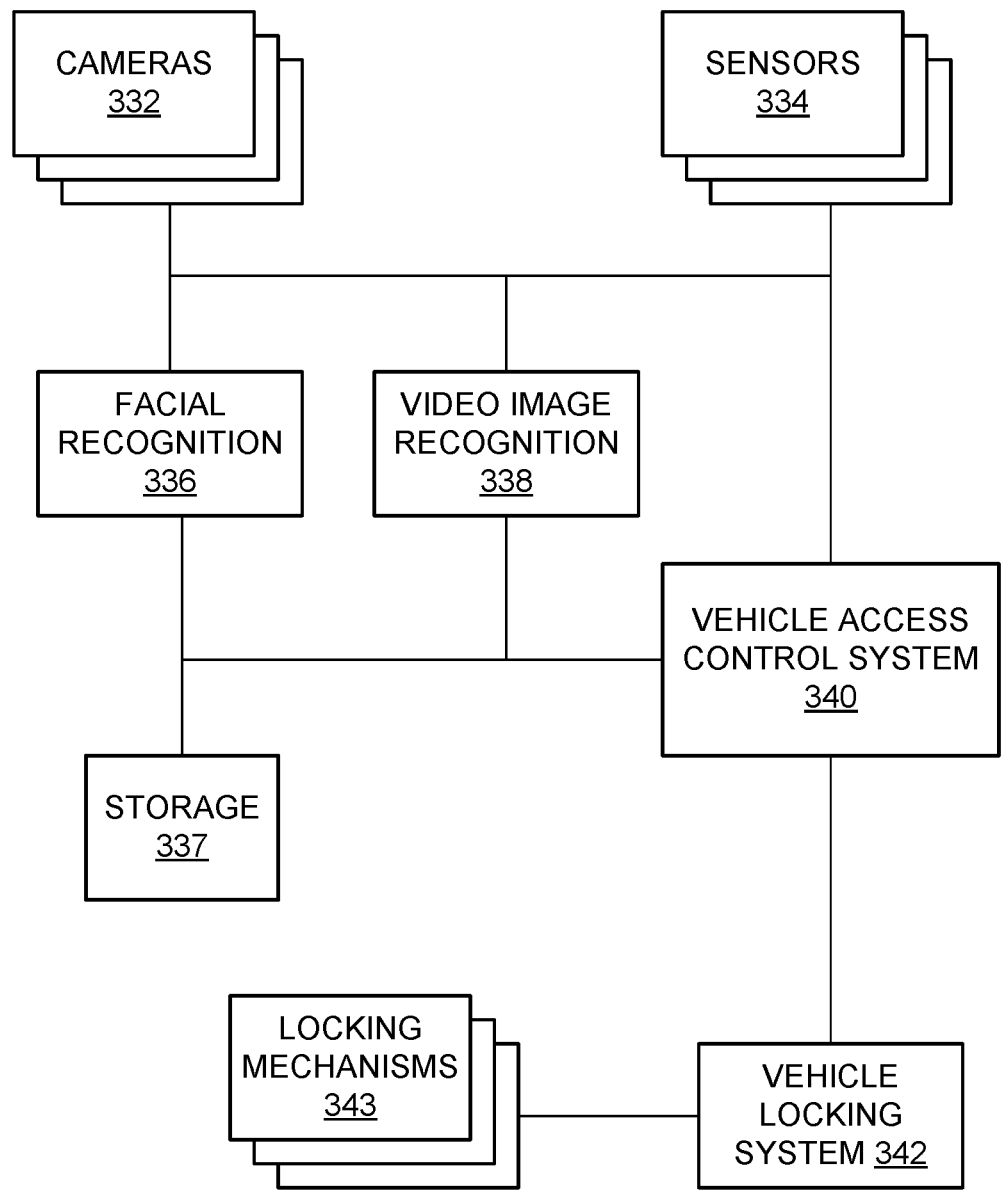
FIG. 5 illustrates an example architecture for a facial recognition system for vehicle access in accordance with one embodiment.

FIG. 5 illustrates an example architecture for a facial recognition system for vehicle access in accordance with one embodiment. This example includes cameras 332, sensors 334, a facial recognition module 336, a video image recognition module 338, a storage device 337, a vehicle access control system 340, a vehicle locking system 342, and various locking mechanisms 343.

Sensors 334 can be used to detect the approach of individuals toward the vehicle. Sensors 334 can include, for example, image sensors, lidar, radar, ultrasonic detectors, acoustic sensors, and other sensors that might be used to detect the approach of individuals. Were sensors 334 include image sensors, these sensors might also perform image capture obviating the need for cameras 332. In this example, sensors 334 provide data to vehicle access control system 340, which uses this information to determine whether individuals are approaching. In some embodiments, vehicle access control system 340 may turn on cameras 332 upon the approach of individuals and it may trigger the operation of facial recognition module 336 and video image recognition module 338. In some embodiments, vehicle access control system 340 may be implemented as a processor-based system including one or more processors and memory. In some embodiments, vehicle access control system 340 may be implemented with any one of facial recognition 336, video image recognition 338, cameras 332, sensors 334, storage 337 and vehicle locking system 342.

Cameras 332 may be included to capture images of approaching individuals. Cameras 332 may include, for example, various types of cameras such as stereo cameras, time-of-flight cameras, depth cameras, or other camera technologies. Cameras 332 may be included to capture still images for facial recognition and object detection, and motion images for behavioral recognition. Any of a number of cameras 332 can be included to capture images external to the vehicle. Cameras 332 can be controlled by vehicle access control system 340 and can provide image data to facial recognition module 336 and video image recognition module 338. In some embodiments, facial recognition module 336 and video image recognition module 338 may be implemented as part of vehicle access control system 340 or as part of cameras 332. Cameras 332 and sensors 334 can provide collected image data and other data to facial recognition module 336 and video image recognition module 338, as well as to vehicle access control system 340.

Facial recognition module 336 may be implemented as a processor-based system that includes facial recognition software with AI capabilities to analyze facial features captured by one or more cameras 332 to determine the identification of approaching individuals. This analysis can be performed by an embedded module within the vehicle or external to the vehicle such as at a cloud server or by edge computing. In some embodiments, this is accomplished by facial recognition module 336 comparing captured images to images stored in storage device 337. In some embodiments, facial recognition module 336 may further be configured to authenticate the approaching individuals once they are recognized, while in other embodiments this may be performed by vehicle access control system 340.

Video image recognition module 338 may also be implemented as a processor-based system that includes video image analysis software to analyze movement, gestures and facial features captured by one or more cameras 332 to determine the nature of approaching individuals, especially where some of the approaching individuals are not recognized individuals. AI techniques can be used to perform the analysis. This analysis can be performed by an embedded module within the vehicle or external to the vehicle such as at a cloud server or by edge computing. Video image recognition module 338 can be configured to analyze body movements, interactions amongst the approaching individuals, facial features or expressions, and other activity. This information can be used by or vehicle access control system 340 to determine whether the unrecognized individuals are hostile or friendly. Video image recognition module 338 may also be used to detect liveliness of approaching individuals.

Vehicle access control system 340 can use the information from facial recognition module 336 and video image recognition module 338 to determine whether to actuate door locking/unlocking mechanisms or to open vehicle doors. For example, where facial recognition module determines that approaching individuals are all recognized and authorized, vehicle access control system 340 may instruct vehicle locking system 342 to actuate the vehicle locking mechanisms 343 to unlock corresponding vehicle doors for the approaching, authorized individuals. As another example, where the system determines that only one approaching individual is recognized and the accompanying unrecognized individuals appear hostile, vehicle access control system 340 may instruct vehicle locking system 342 to unlock only one door for the recognized individual and leave the other doors locked. This can be performed by an embedded module within the vehicle or external to the vehicle such as at a cloud server or by edge computing. Although not illustrated in FIG. 5, vehicle access control system 340 may also instruct an alarm system to initiate the vehicle alarm (audible, visual, or otherwise) and it may instruct a messaging system to send alert to authorities, relatives, or other designated recipients.

Although not illustrated in FIG. 5, a communication module may also be included to allow the vehicle access control system to communicate with a server (e.g., a cloud server or other remote server) or with edge computing resources to perform functions such as image recognition and analysis. Some or all of these functions can be performed external to the vehicle or internal to the vehicle depending on system design preferences. Accordingly, appropriate wireless communication interfaces (e.g., cellular data, LTE, 5G, etc.) can be provided to enable such communication.

Figure 6:
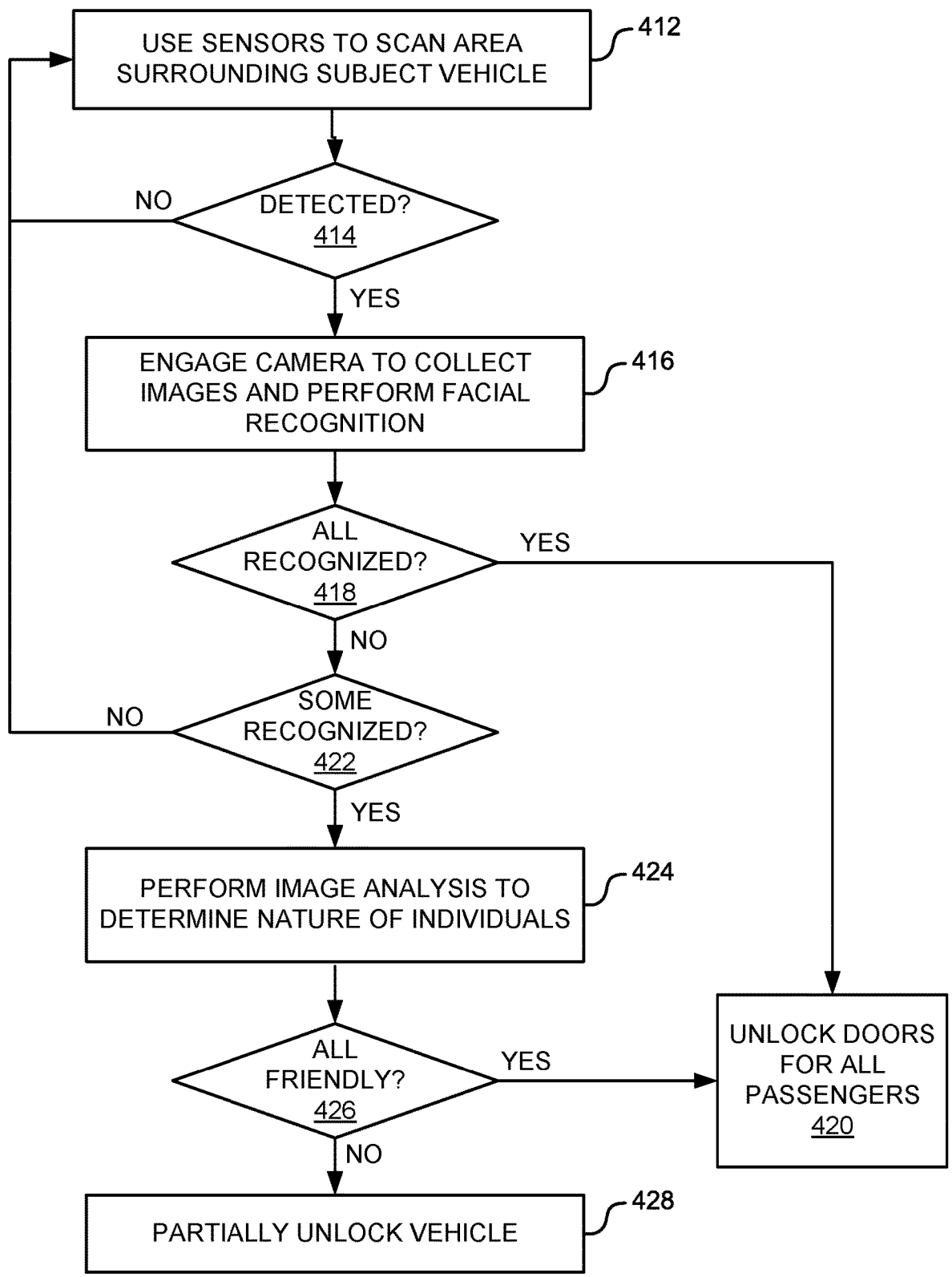
FIG. 6 illustrates an example process for facial recognition access control in accordance with one embodiment.

FIG. 6 illustrates an example process for facial recognition access control in accordance with one embodiment. With reference now to FIG. 6, at operation 412, the system uses sensors to scan the area surround the subject vehicle. In some embodiments, sensors from surrounding vehicles or infrastructure equipment in the area might also be used, and can transmit sensor data to the subject vehicle (or to a server such as for cloud-based systems, or to multiple vehicles for edge-based processing) to determine whether one or more individuals are approaching the vehicle. As noted above, any of a number of different sensors can be utilized, including radar, lidar, ultrasonic, image sensors and other sensors.

The system receives the sensor data and evaluates it to determine whether one or more individuals are approaching the vehicle. The system may also evaluate other data, such as key fob data to detect or verify the presence of approaching individuals. If no approaching individuals are detected at operation 414, the system continues scanning the vehicle proximity. If the system determines that individuals are approaching, the system engages one or more image sensors (e.g., one or more cameras) to collect images of the approaching individual or individuals.

At operation 416, the system performs image recognition on the approaching individual or individuals to determine whether some or all of the individuals are recognized as authorized individuals to enter or operate the vehicle. This analysis can be performed on board the vehicle or via external processing capabilities such as a cloud-based service system or an edge computing network. In terms of the example illustrated in FIG. 5, this recognition can be performed by facial recognition module 336, which may be a standalone processing system or may be integrated with a vehicle access control system 340, a vehicle locking system 342, or other vehicle systems.

At operation 418, if all of the approaching individuals are recognized the process continues at operation 420 where system instructs the vehicle locking system to unlock all of the vehicle doors for the passengers. In some embodiments, the system may be configured to cause all vehicle doors to be unlocked or all vehicle doors plus any cargo compartment doors and the fuel filler door. In another embodiment, the system can be configured to unlock one door for each approaching recognized passenger, which may be fewer than the total number of doors on the vehicle. In cases in which the vehicle includes actuators to physically open and close various doors, the system can further be configured to open the vehicle doors as well as to unlock them.

The system may further be configured to determine the identity of recognized approaching individuals and unlock or open specific doors corresponding to the identified recognized individuals. As one example, the system may recognize two individuals approaching and determine that they are particular, known individuals. Either through using stored profiles for the identified individuals, or by using machine learning techniques to recognize and learn behavior of approaching individuals based on their historic practices, the system may determine that one approaching of individual typically drives the vehicle and the other approaching individual is typically a passenger in the front passenger seat. Based on this determination, the system can open the left and right front doors of the vehicle and configure the vehicle settings according to the user profiles corresponding to the identified individuals.

However, if none of the approaching individuals are recognized, at operation 422 the system does not unlock the vehicle and the scanning can continue at operation 412 for further approaching individuals. In some applications, the system may be configured to increase vehicle security where none of the approaching individuals are recognized. On the other hand, if some but not all of the approaching individuals are recognized, the system may perform image analysis at operation 424 to determine the nature of the individuals. Image analysis can be performed on still and moving images to determine the interplay between recognized and unrecognized individuals approaching the vehicle. The system may use the interplay or other information to determine an emotional level among the approaching individuals. Machine learning techniques can be used to build and train a model to recognize different types of behavior or interplay among the individuals. For example, the system may detect signs of hostility or other heightened emotions among the individual such as pushing or shoving, and unrecognized individuals sternly grabbing the arm of a recognized individual, an expression of fear or concern on a recognized individual's countenance, and so on. The system may likewise detect signs of friendliness or camaraderie among the individuals such as, for example, laughter or playfulness, the individuals holding hands were walking arm in arm, smiles or cheerfulness, and so on. The system may further be configured to determine whether a detected level of hostility rises above a set threshold level to determine whether the interaction is hostile enough to partially or fully restrict vehicle access.

Where all individuals appear friendly, the process may continue at operation 420 where all the vehicle doors are unlocked, or where one vehicle door corresponding to each approaching individual may be unlocked. For recognized individuals, profiles can again be used to open the appropriate doors for those individuals and configure vehicle settings at their usual seating positions for those vehicles. Where individuals are unrecognized friendly individuals and no profile is available to them, the system may make an educated determination as to which doors to open and how to configure the seating positions. For example, where unrecognized, friendly young children are approaching the vehicle with a recognized adult, the system may be configured to unlock or open the rear doors for the children and configure seating or seatbelt settings for young children in those rear seats.

For the unrecognized individuals who do not appear friendly, the system may be configured to react accordingly such as partially unlocking the vehicle as shown at operation 428. The system can be configured to use image analysis to determine where the recognized person or persons are approaching the vehicle and unlock only those stores necessary for the recognized persons so that they may enter the vehicle, while the unfriendly approachers would hopefully still be locked out. The system can further be configured to sound the vehicle alarm if it determines that the level of friendliness has escalated to the point necessary. For example, the system may determine that the friendly driver and passenger were able to enter the vehicle and close and lock all the doors. In this case, the system may not sound an alarm or issue any alerts. However, the system may determine that the altercation has escalated and the recognized driver and passenger are hindered from entering the vehicle or potentially in danger. In this case, the system may sound the vehicle alarm to warn away the would be attackers or otherwise draw attention to the situation and the system may send alerts to authorities or appropriate individuals.

Image analysis may also be used to perform object detection in various circumstances, regardless of whether imaging analysis determines that some, all or none of the approaching individuals are recognized. For example, the system may use image analysis to determine whether any individuals approaching the vehicle are brandishing firearms or other actual or potential weapons. Where and recognized individual is carrying a weapon, the system may on that basis determine that this is an unfriendly and possibly dangerous situation, and respond by partially unlocking the vehicle so that the recognized individual may enter the vehicle. As another example, the system may determine other objects such as the presence of pets or that a recognized individual is carrying a package of a particular dimension (e.g., above a threshold of dimensions). Further to this example, where the recognized individual is carrying a large package, pushing a full shopping cart, or otherwise presenting a possible load to the vehicle, the vehicle can be configured to automatically open the cargo compartment door so that the recognized objects can be loaded into the cargo compartment.

In further scenarios, the system may be configured to determine that some of the unrecognized individuals accompanying a recognized individual are friendly while other unrecognized individuals are not friendly. In this case, the system may unlock vehicle doors for the recognized individual and for those individuals recognized as friendly, while not unlocking doors for the unrecognized unfriendly individuals.

The system can be programmed (e.g. at the factory, service provider, or via over-the-air (OTA) update) to determine whether unrecognized individuals are friendly or unfriendly. As noted above, machine learning techniques can be used to further train and refine models used to allow the system to determine the nature of approaching unrecognized individuals. Crowd sourced data or other data from a plurality of different sources can be gathered and used to train the models. Facial recognition to recognize and determine the identification approaching individuals can be performed, for example, at the vehicle by the users, in the smart phone or other app by the users, or at the dealer or service provider. Users can allow their facial features to be scanned and cause the scan to be stored as part of a user profile. The vehicle can further build the profile based on a learned user behavior in the system may be configured to allow the user to enter user preferences for his or her profile. These profiles might include, for example, a user's typical seating position, configuration of vehicle settings for that user (e.g., seat settings, mirror settings, radio settings, driving mode settings, and so on) and other user information. The user profiles may be stored securely at the vehicle or at a server such as a cloud server.

Various embodiments may be configured to use additional environment information to inform the determination of the various vehicle unlocking scenarios. For example, geofencing or geographic information may be used to adjust the unlocking scenarios based on the security or safety of the geographic area in which the vehicle is parked. Date and time information can be used as well. The system can be configured to be more lenient toward unidentified passengers if the vehicle is in a location that is more secure or at a time updated is generally safer (e.g., a relatively safe neighborhood or a secure parking facility in the daytime) and less lenient toward unidentified passengers if the vehicle is parked in a less secure area or other time of day that is less safe (e.g., in a bad neighborhood or in an empty parking lot at night). Third-party data sources such as crime databases or databases containing information about parking facilities can be used as can crowd sourced information relevant to security (e.g., sourced from vehicles with a similar system or from various other users reporting crime information) can be used to build a model to predict the safety of a geographic region in which the vehicle is parked. This information can also be used to warn a driver that they are entering or parking in an unsafe area.

Another example of environmental information that can be used to inform the determination of the unlocking scenarios is information relating to calendar or message data of a user or user habits. As one example, a user's calendar entry may indicate that the user is picking up friends or relatives from the airport, at a school, or at another location at a particular place and time. Messages exchanged with friends and family may provide similar information. The system may use this information to weight the prediction regarding whether the unidentified individuals approaching the vehicle with the user at the scheduled pickup location and time are friendly companions. The system can also be configured to learn user habits and use this information to weight the prediction as well. A commercial driver for example may make frequent late-night pickups at the airport or train stations. Likewise, a parent may frequently pick up high school aged children after football practice. The system can learn this behavior and where the behavior fits the pattern, weight the prediction regarding whether the unidentified individuals approaching the vehicle with the user at the learned pickup times and locations are friendly companions.

In various embodiments, the user can be given the option to configure the system to "pickup mode" or other lenient setting prior to exiting and locking the vehicle at the pickup location. The system can also be configured to provide the user with settings or user configurable options to allow the user the ability to configure the system to his or her liking. For example, the system can give the user the ability to select from a range of modes from strictest to most lenient; the system can be configured to provide a kid-friendly mode to provide a more lenient setting for younger unrecognized individuals; and so on.

In further embodiments, information obtained from the system can be shared with law enforcement, security forces or other entities organizations for purposes beyond vehicle unlocking scenarios. Where the system detects individuals who appear to be engaged in nefarious activity, the system can be configured to provide an alert to a third party such as law enforcement that potentially nefarious activity is occurring. The system can share captured video, still images and other sensor information with law enforcement to aid in identifying activity, responding to the scene and potentially identifying individuals involved in the activity.

Figure 7:
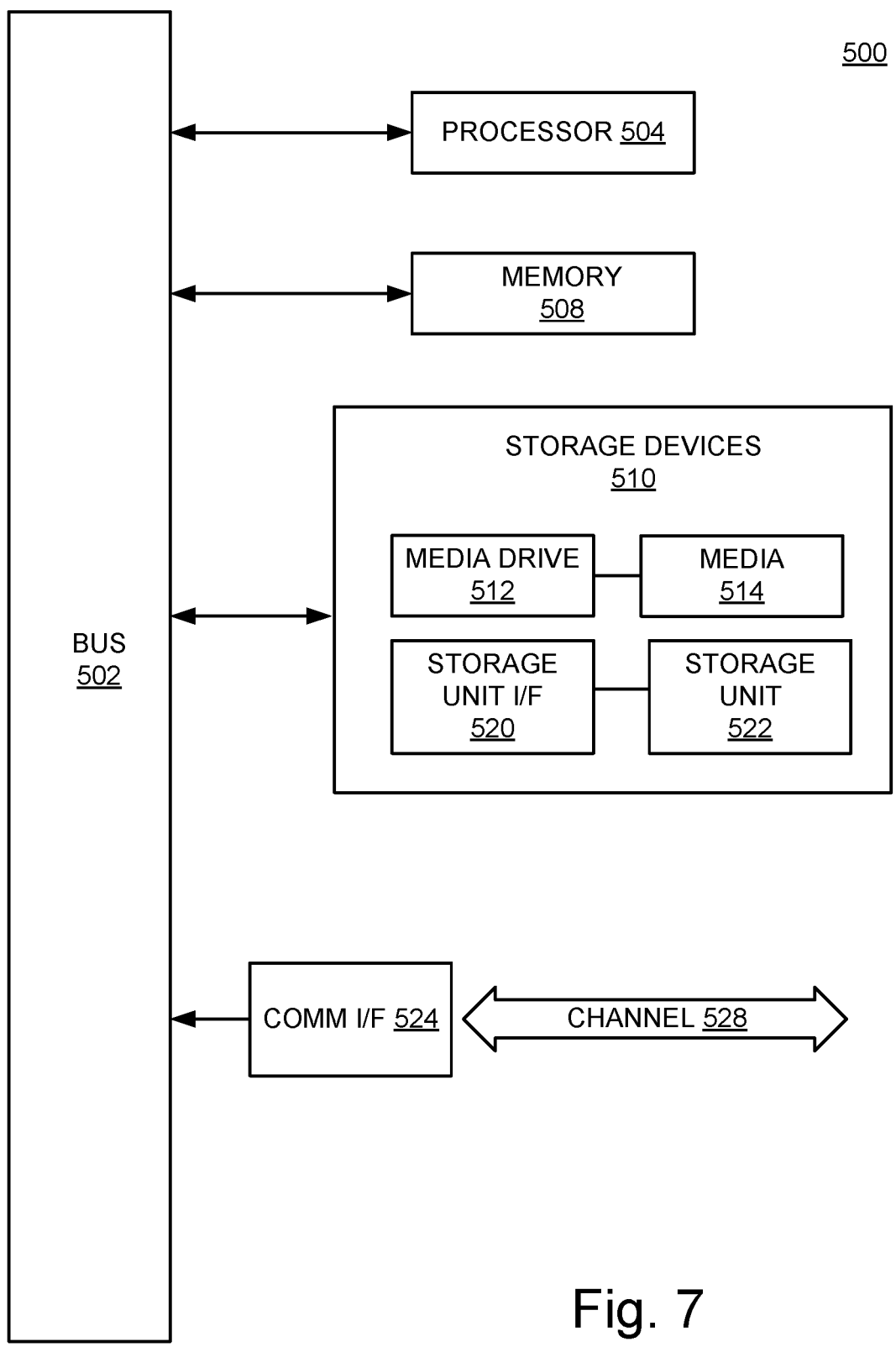
FIG. 7 is an example computing component that may be used to implement various features of embodiments described in the present disclosure.

As used herein, the term module might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where modules are implemented in whole or in part using software, these software elements can be implemented to operate with a computing or processing component capable of carrying out the functionality described with respect thereto. One such example computing component is shown in FIG. 7. Various embodiments are described in terms of this example-computing component 500. After reading this description, it will become apparent to a person skilled in the relevant art how to implement the application using other computing components or architectures.

Referring now to FIG. 7, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port, WiFi interface, Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of biometric access control for a vehicle, comprising:
   using an image sensor to capture an image of two or more individuals approaching the vehicle;
   a facial recognition module analyzing the captured image to determine whether one or more of the individuals approaching the vehicle is an authorized user of the vehicle;
   where at least one, but not all, of the two or more individuals approaching the vehicle is identified as an authorized user of the vehicle, an image analysis module analyzing the captured image to determine an emotional level between an authorized user of the vehicle and an unauthorized user of the vehicle; and
   performing a vehicle access security operation based on the determined emotional level between the authorized user of the vehicle and the unauthorized user of the vehicle.

2. The method of claim 1, wherein the vehicle access security operation comprises:
   opening a door for each of the approaching individuals where an interaction between the authorized user of the vehicle and the unauthorized user of the vehicle is determined to be an unhostile interaction; and
   opening a door for only the authorized user of the vehicle when an interaction between the authorized user of the vehicle and the unauthorized user of the vehicle is determined to be a hostile interaction.

3. The method of claim 2, wherein opening a door comprises unlocking the door or physically opening the door.

4. The method of claim 1, wherein the vehicle access security operation comprises not opening any door of the vehicle when the interaction between the authorized user of the vehicle and the unauthorized user of the vehicle is deemed to be a hostile interaction.

5. The method of claim 1, further comprising initiating an alert when the interaction between the authorized user of the vehicle and the unauthorized user of the vehicle is deemed to a hostile interaction.

6. The method of claim 1, wherein analyzing the captured image to determine whether one or more of the individuals approaching the vehicle is an authorized user of the vehicle comprises performing facial recognition on a captured image of the one or more individuals to determine an identify of the one or more individuals approaching the vehicle.

7. The method of claim 6, further comprising determining a user profile for an identified individual and using the user profile to determine a seating position for that identified individual and which vehicle door to open corresponding to that seating position.

8. The method of claim 7, further comprising using the user profile to adjust vehicle configuration settings at the seating position determined for the identified individual.

9. The method of claim 1, further comprising: analyzing the captured image to identify individuals of the plurality of individuals approaching the vehicle; and based on identification of one or more authorized users of the vehicle approaching the vehicle, opening a particular door of the vehicle for each of the identified individuals approaching the vehicle who are authorized users of the vehicle.

10. The method of claim 1, further comprising: analyzing the captured image to determine a class of an unidentified individual, and determining a door of the vehicle to open for that individual based on the determined class of the individual.

11. The method of claim 1, further comprising using environmental information to weight the determination of an emotional level between an identified authorized user of the vehicle and an unauthorized user of the vehicle.

12. A vehicle control system, comprising:
   a processor; and
   a memory coupled to the processor to store instructions, which when executed by the processor, cause the processor to perform operations, the operations comprising:

capturing an image of two or more individuals approaching the vehicle;

analyzing the captured image to determine whether one or more of the individuals approaching the vehicle is an authorized user of the vehicle;

where at least one, but not all, of the two or more individuals approaching the vehicle is identified as an authorized user of the vehicle, analyzing the captured image to determine an emotional level between an authorized user of the vehicle and an unauthorized user of the vehicle; and performing a vehicle access security operation based on the determined emotional level between the authorized user of the vehicle and the unauthorized user of the vehicle.

13. The system of claim 12, wherein the vehicle access security operation comprises:

opening a door for each of the approaching individuals where an interaction between the authorized user of the vehicle and the unauthorized user of the vehicle is determined to be an unhostile interaction; and opening a door for only the authorized user of the vehicle when an interaction between the authorized user of the vehicle and the unauthorized user of the vehicle is determined to be a hostile interaction.

14. The system of claim 13, wherein opening a door comprises unlocking the door or physically opening the door.

15. The system of claim 12, wherein the vehicle access security operation comprises not opening any door of the vehicle when the interaction between the authorized user of the vehicle and the unauthorized user of the vehicle is deemed to be a hostile interaction.

16. The system of claim 12, wherein the operations further comprise initiating an alert when the interaction between the authorized user of the vehicle and the unauthorized user of the vehicle is deemed to a hostile interaction.

17. The system of claim 12, wherein analyzing the captured image to determine whether one or more of the individuals approaching the vehicle is an authorized user of the vehicle comprises performing facial recognition on a captured image of the one or more individuals to determine an identify of the one or more individuals approaching the vehicle.

18. The system of claim 17, wherein the operations further comprise determining a user profile for an identified individual and using the user profile to determine a seating position for that identified individual and which vehicle door to open corresponding to that seating position.

19. The system of claim 18, wherein the operations further comprise using the user profile to adjust vehicle configuration settings at the seating position determined for the identified individual.

20. The system of claim 12, wherein the operations further comprise: analyzing the captured image to identify individuals of the plurality of individuals approaching the vehicle; and based on identification of one or more authorized users of the vehicle approaching the vehicle, opening a particular door of the vehicle for each of the identified individuals approaching the vehicle who are authorized users of the vehicle.

21. The system of claim 12, wherein the operations further comprise: analyzing the captured image to determine a class of an unidentified individual, and determining a door of the vehicle to open for that individual based on the determined class of the individual.

22. The system of claim 12, wherein the operations further comprise using environmental information to weight the determination of an emotional level between an identified authorized user of the vehicle and an unauthorized user of the vehicle.

\* \* \* \* \*